United States Patent [19]
Stewart

[11] 3,794,175
[45] Feb. 26, 1974

[54] OIL RECOVERY APPARATUS

[76] Inventor: Joe K. Stewart, 22818-102nd Pl. West, Edmonds, Wash. 98020

[22] Filed: May 15, 1972

[21] Appl. No.: 253,433

[52] U.S. Cl............................ 210/242, 210/DIG. 21
[51] Int. Cl............................................. E02b 15/04
[58] Field of Search........ 210/DIG. 21, 242, 61, 1 F, 210/83, 84

[56] References Cited
UNITED STATES PATENTS

| | | | |
|---|---|---|---|
| 3,534,859 | 10/1970 | Amero et al.......................... | 210/242 |
| 3,661,264 | 5/1972 | Peterson............................. | 210/242 |
| 2,702,786 | 2/1955 | Hakes............................... | 210/242 X |
| 3,348,690 | 10/1967 | Cornelissen......................... | 210/242 |
| 3,665,713 | 5/1972 | Rath................................ | 61/1 F |
| 3,642,140 | 2/1972 | Parker............................. | 210/DIG. 21 |
| 1,579,917 | 4/1926 | Demming........................... | 210/242 |

FOREIGN PATENTS OR APPLICATIONS 1,284,363  4/1969  Germany ..................... 210/DIG. 21

Primary Examiner—Frank A. Spear, Jr.
Assistant Examiner—T. A. Granger
Attorney, Agent, or Firm—Delbert J. Barnard

[57] ABSTRACT

Floating oil is picked up by water jets and carried over a vertical wall into a receiving chamber. The water jet forming nozzles and the receiving chamber are parts of a floating vessel. The water jet forming nozzles are positioned to discharge upwardly through the floating oil. Float controlled mechanisms automatically maintain the jet nozzles properly oriented with respect to the receiving chamber wall.

18 Claims, 4 Drawing Figures

OIL RECOVERY APPARATUS

BACKGROUND OF THE INVENTION

1. Field of the Invention

This invention relates to apparatus for removing a floating liquid (such as an oil slick) from a body of heavier liquid (such as fresh or salt water), and more particularly to the provision of a floating apparatus for such purpose which is adapted to operate effectively while pitching (e.g., by wave or swell action in moderately heavy seas).

2. Description of the Prior Art

Various solutions have been proposed to the problem of removing floating oil from open bodies of water. The approach which appears to be receiving the most interest involves sending a vessel into the oil spill area and using such vessel to recover the floating oil by picking it up from the water. Examples of vessels proposed for this purpose are disclosed by U.S. Pat. No. 2,876,903, granted Mar. 10, 1959 to Harry W. Lee; by U.S. Pat. No. 3,565,254, granted Feb. 23, 1961 to John P. Latimer; and by U.S. Pat. No. 3,630,376, granted Dec. 28, 1971 to Larry D. Price.

SUMMARY OF THE INVENTION

The principal object of the present invention is to provide a vessel which is adapted to remove floating oil from moderately heavy as well as relatively calm seas. Herein, the term "moderately heavy seas" is used to describe water conditions which would cause substantial pitching of a floating object and would require a substantial amount of "freeboard" on a floating tank in order to prevent excessive floating. Such term includes both short choppy wave and long swell conditions.

The oil recovery vessel of this invention is provided with a receiving chamber having an upstanding side wall presenting a freeboard of a height sufficient to prevent excessive flooding of the receiving chamber during use in "moderately heavy seas." A plurality of water jet forming nozzles are supported on the vessel and are positioned to discharge upwardly through the floating oil and then over such upstanding wall into the receiving chamber. The floating oil is attracted to the water jet streams and is picked up and carried by them into the receiving chamber. Each nozzle is individually supported by a float operated mechanism adapted to automatically maintain it in a proper discharge attitude with respect to the side wall.

According to the invention, the receiving chamber includes an annular outer compartment into which the oil is initially delivered, and an inner compartment. Both compartments are open at their lower ends. During operation a column of recovered oil builds up in the annular outer chamber. As the column increases in depth its lower level drops until eventually the oil is in communication with a plurality of apertures formed in a vertical separating wall between the inner and outer compartments. The collected oil flows from the outer compartment through these apertures into the inner compartment and rises therein. An oil pickup pipe leading from a pump, and preferably having a float controlled inlet valve, is provided on the vessel. It includes an inlet positioned in the inner compartment slightly below the oil surface in such compartment.

Although the present invention is described in relationship to the problem of cleaning up oil spills or slicks on natural bodies of water, it is to be understood that it has general utility and can be used in other situations wherein it is desired to remove a floating first liquid from atop a second heavier liquid.

Other features, characteristics and advantages of the present invention will be apparent from the description of a typical and therefore nonlimitive embodiment of the invention, described below in conjunction with the accompanying illustration.

BRIEF DESCRIPTION OF THE DRAWING

In the drawing like element designations refer to like parts, and.

DESCRIPTION OF THE PREFERRED EMBODIMENT

Figure 1:
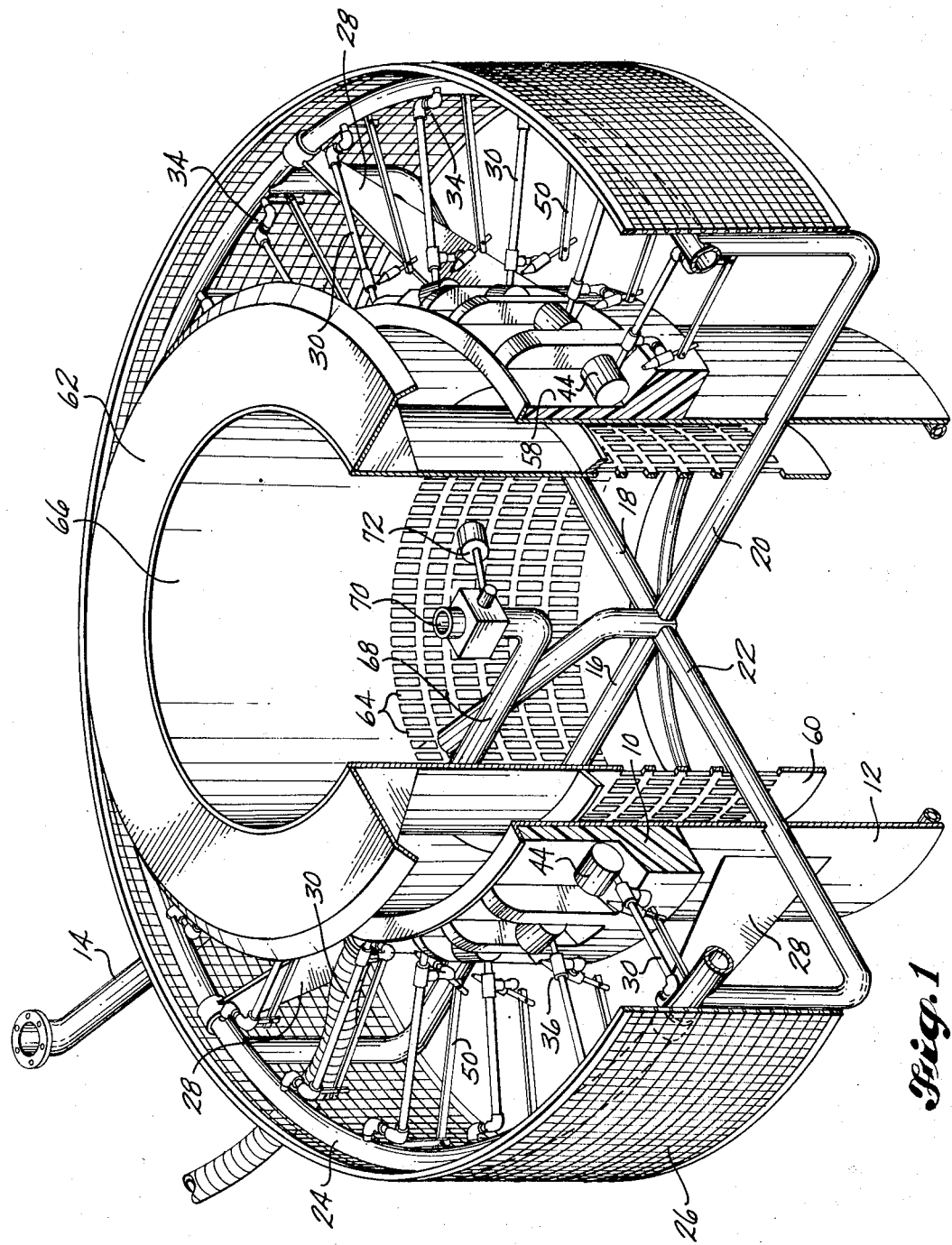
FIG. 1 is an isometric view of a floating oil recovery vessel incorporating the present invention, with the foreground quarter section of the vessel cut away for clarity of illustration.
Figure 2:
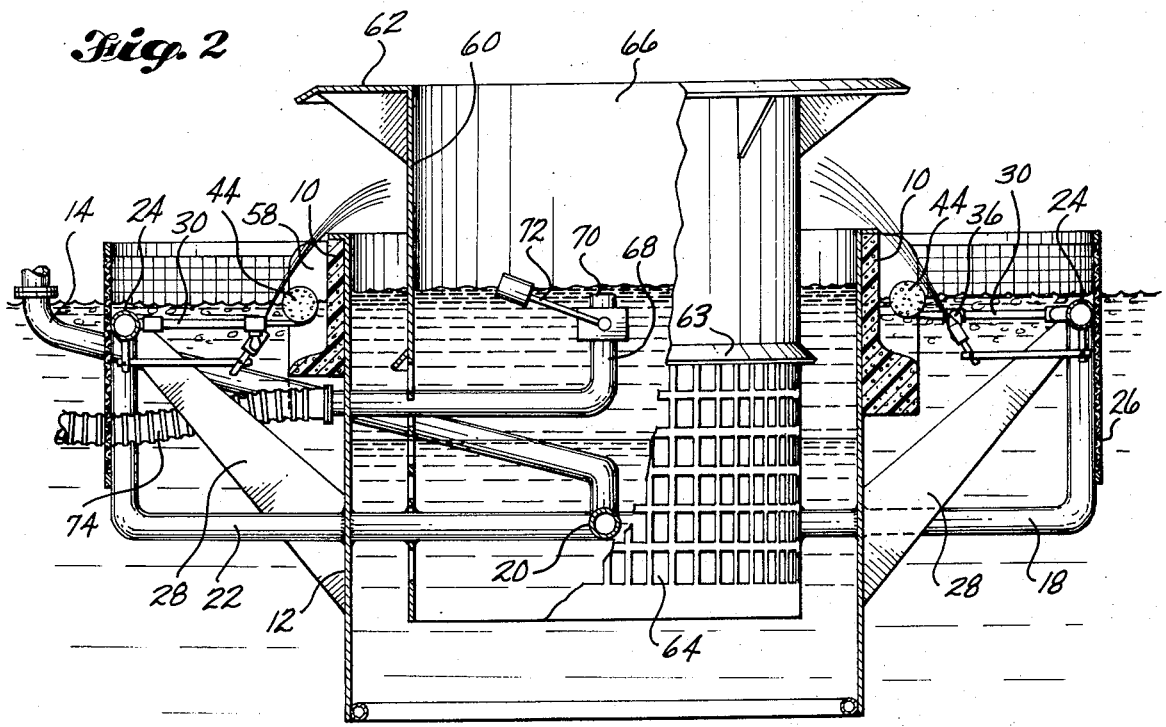
FIG. 2 is a vertical sectional view of the vessel, with some parts shown in side elevation.

As shown by FIGS. 1 and 2, the illustrated embodiment comprises a floatation ring 10 which may be constructed from a closed cell foam plastic material. Floatation ring 10 extends circumferentially about the upper portion of a cylindrical wall 12. Wall 12 extends upwardly above the water surface an amount sufficient to provide the wall 12 with a freeboard which will resist excessive flooding in moderately heavy or calmer seas.

Referring to FIG. 1, a water pipe 14 leading from a pump (not shown) extends from a position outboardly of the vessel radially inwardly to the center of the vessel. At the center of the vessel pipe 14 communicates with four branch pipes 16, 18, 20, 22. The branch pipes 16, 18, 20, 22 extend radially outwardly from the inboard end of conduit 14 and through openings in the wall 12. Outwardly of the wall 12 the pipes 16, 18, 20, 22 turn upwardly and extend to connection points with a circular manifold ring 24. Each of the pipes 16, 18, 20, 22 feed water to the manifold ring 24.

The conduits 16, 18, 20, 22 and the circular manifold 24 also serve as skeletal structural members of the vessel. The pipes 16, 18, 20, 22 are welded or otherwise firmly connected to the wall 12. A cylindrical screen 26 is secured to and is supported by the manifold ring 24, and by the upstanding portions of the conduits 16, 18, 20, 22. Screen 26 stops floating logs, sticks and debris, and prevents them from collecting about and interfering with the nozzles. A plurality of radial gusset plates 28 may be rigidly interconnected between the manifold ring 24 and the wall 12, to provide additional structural rigidity to the vessel.

Figure 3:
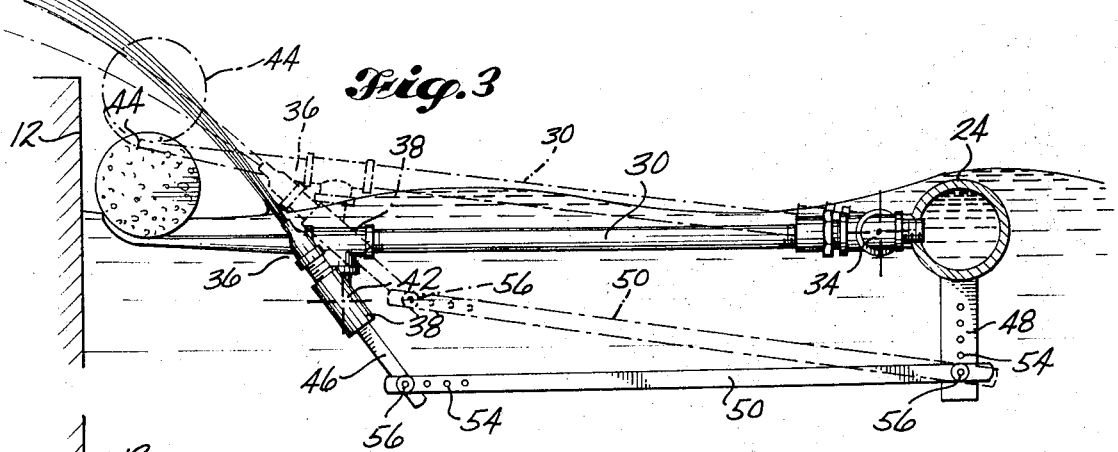
FIG. 3 is an enlarged scale side elevation view of one of the pickup jet assemblies, including a solid line showing of a first position of such assembly and a broken line showing of a second position of such assembly.
Figure 4:
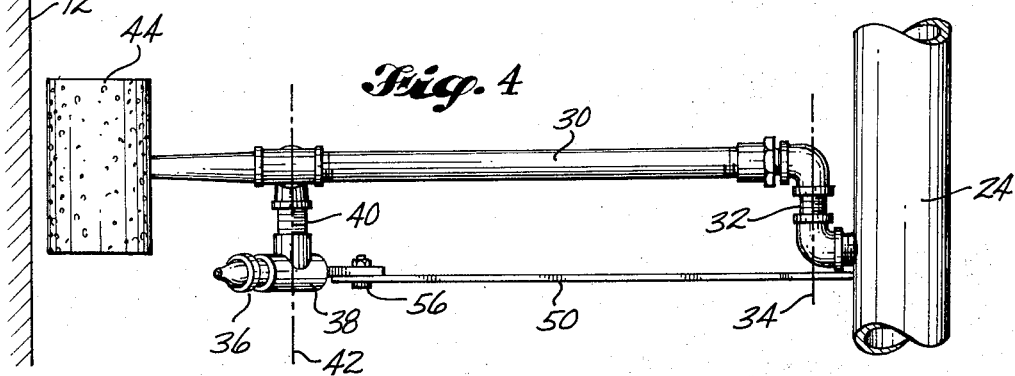
FIG. 4 is a top plan view of the pickup jet assembly shown by FIG. 3.

A plurality of elongated support arms 30 extend radially inwardly from the manifold ring 24 to the floatation ring 10. These support arms 30 are pivotally connected at their outer ends to the manifold ring 24, for vertical swinging movement about horizontal axes. By way of typical and therefore nonlimitive example, each support arm 30 may be a pipe which is connected to the manifold ring 24 by means of a swivel 32 which permits pivotal movement about an axis 34 (FIGS. 3 and 4). Each support arm 30 supports at least one inwardly leaning jet nozzle 36. The nozzle 36 is supported at the upper end of a pipe 38 which in turn is pivotally connected to the support arm 30 by a swivel 40, for pivotal movement about a horizontal axis 42.

According to the invention, a float 44 is secured to the inner end of each support arm 30. A short member 46 extends axially downwardly from pipe 38, to with the pipe 38 form a control link. Another control link 48 is rigidly secured at its upper end to the manifold ring 24 and depends downwardly therefrom. A horizontal control link 50 is disposed below the support arm 30. It is pivotally connected at its inner end to the lower portion of member 46 and at its outer end to the lower portion of link 48. For adjustment purposes, link 48 and the inner end of link 50 may be provided with a plurality of openings for selective alignment with single openings provided in the members 50, 46. The pivot joint may be formed by a bolt 56 inserted through the aligned openings and suitably secured in place by a nut.

As best shown by FIG. 3, the support arm 30 and the control links 48, 50 and 38, 46 together form an attitude control linkage for the jet nozzle 36 which is responsive to up-and-down movement of the float 44. These attitude control mechanisms serve to automatically maintain the pumping water nozzles properly oriented (viz. at a proper angle) relative to wall 12 and the surface (viz. with the nozzle outlets about 1/2 inch below the surface), so that the water jets formed thereby are always in position to pick up oil and to travel over the upper edge of the wall 12.

Preferably, a radial recess 58 for each float 40 is formed within the floatation ring 10. This permits a closer placement of the nozzles 36 relative to the wall 12. Also, the recesses protect the floats from lateral wave forces and provide bottom stops for the floats. Location of the control floats 44 at the inner ends of the arms 30 is quite important. It results in a large inlet area to the nozzle regions unobstructed by the floats.

In operation, sea water is pumped through the delivery pipe 14. From pipe 14 the water flows through pipes 16, 18, 20, 22 to the manifold ring 24. The water then flows from manifold ring 24 radially inwardly through the support arms 30 to the jet nozzles 36. The nozzles 36 are supported in the water with their outlets positioned to discharge generally upwardly. It is believed that the best results are obtained when the outlets are below the surface and arranged to discharge through the layer of oil on the body of water in which the vessel is floating. As each jet stream penetrates the oil layer it picks up oil and carries it over the wall 12 into the receiving chamber defined inside of the wall 12. However, in some installations the outlet may be positioned at or slightly above the surface. In such an installation it may be necessary to provide the nozzle with an accelerator tube or venturi of the jet pump type in order to achieve effective pickup. Gravity separation of the oil and water occurs within the receiving chamber.

An eight jet pilot model of my invention was tested in a tank into which diesel oil was poured. The eight jets removed the oil at the rate of about one barrel each 1½ minutes. Additional tests conducted in Puget Sound off pier 43, Seattle, Washington, proved the apparatus to be workable in a large natural body of water.

A smaller diameter cylindrical wall 60 is supported (such as by the pipes 16, 18, 20, 22 and additional gusset plates as necessary) inside the receiving chamber, in spaced relationship from the wall 12. A plurality of inlet openings are provided in the lower portion of wall 60, below a circular skirt 63. Wall 60 projects upwardly above wall 12 and in its upper extent may serve as a deflector plate for the oil-water jet streams. An annular hood 62 may be secured to the top of wall 60 to limit the amount of upward flow of the oil-water jet streams.

According to the invention, the receiving chamber formed by wall 12 is open at its bottom. As oil is received with the annular space defined between walls 12, 60 it forms a vertical column in such space. The upper surface of the oil column is disposed above the liquid surface outwardly of wall 12. As the oil column increases in depth its upper surface rises and its lower boundary moves downwardly. Eventually the oil column will be deep enough to extend below the skirt 63. When this happens, the oil will flow radially inwardly through the openings 64 into the inner compartment formed by wall 60. A pickup pipe 68 is located within this inner compartment 66. Its upper end is substantially isolated from wave action by the walls 12, 60 and is located at such a height that it is in communication with the oil only. Preferably, the pickup pipe 68 is provided with a float control valve 72. This valve 72 is designed to open when the oil level within chamber 66 is at or above the outlet 70. At other times valve 72 is closed. More specifically, when water alone is in the inner zone the liquid level is not high enough to move the valve control float from its closed to its open position. The addition of oil to the inner zone raises the liquid level in such zone and eventually the level is high enough to move the float into a valve opening position.

Pickup pipe 68 communicates with an intake pipe 74 leading to a pump (not shown). This pump serves to move the removed oil onto a barge, tank or other suitable receptacle.

An advantage of the water jet pickup system is that it does not require movement of the vessel towards the oil to be picked up. As a result, a head wave does not develop where the water meets the vessel, attended by a thinning out of the oil layer. Also, it permits a full 360° entry of the oil to the pickup regions. Further, it does not involve flow of the oil and water over or across a large area surface, such as the baffle surface disclosed by the aforementioned U.S. Pat. No. 3,630,376. Systems utilizing a flow baffle experience friction losses and also flooding in all but calm waters. A further advantage of the system of this invention is that the rise and fall of the oil and water as they travel over the wall 12 results in aeration of the water which is believed to be beneficial to restoration of the water to or near its natural state.

According to the invention, an accelerator tube may be provided coaxially around each nozzle 36 to form a confined passage jet pump.

Plural water jet forming nozzles may be provided at the inner end of each control linkage. Also, the water conduit means may be separated from the linkage. For example, a flexible hose may be interconnected between the manifold 24 and the nozzles, with the linkage being formed by non-water carrying structural members.

What is claimed is:

1. Apparatus for separating a first liquid from a second liquid on which such first liquid is floating, comprising:

a receiving chamber floatingly supported by said second liquid, said chamber having an upwardly opening inlet and a generally vertical side wall extending upwardly from the second liquid, to provide freeboard above the surface of the floating first liquid, said generally vertical side wall defining a boundary of said inlet;

a jet forming nozzle having an outlet;

means supporting said jet forming nozzle during use outwardly of said receiving chamber, with its outlet positioned to discharge generally upwardly through said first liquid, over said generally vertical side wall and into the inlet of said receiving chamber; and means for delivering a fluid to and through said jet forming nozzle at sufficient discharge velocity so that it entrains some of the first liquid and carries it over said wall and through said inlet, into said receiving chamber.

2. Apparatus according to claim 1, wherein said jet forming nozzle includes attitude control means responsive to wave action for changing the attitude of said jet forming nozzle as necessary to maintain the outlet of said jet forming nozzle positioned to discharge generally upwardly and over said receiving chamber wall during wave action movement of such apparatus.

3. Apparatus according to claim 2, wherein said attitude control means comprises a support member spaced horizontally from said wall and fixed in position with respect to said wall, an elongated support arm pivotally connected to said support member and extending therefrom towards said wall, a float on said arm relatively adjacent said wall, a first link to which said jet forming nozzle is secured, said link being pivotally connected to said support arm at a location spaced a substantial distance from said support member, said first link depending downwardly from such pivotal connection, a second link fixed at its upper end to said support member and depending downwardly therefrom, and a third link spaced below said support arm, said third link being pivotally connected at one of its ends to the first link and at its other end to the second link, whereby during wave action movement of the apparatus the float lifts said support arm and the control linkage, formed by the support arm and the first, second and third links, functions to maintain the jet forming nozzle outlet properly oriented to discharge over said wall.

4. Apparatus according to claim 2, wherein said attitude control means is adapted to change the angle of the jet forming nozzle relative to the wall in response to a change in height of such nozzle.

5. Apparatus according to claim 1, wherein said receiving chamber is circular in shape and said generally vertical side wall is cylindrical, and wherein said apparatus is provided with a plurality of said jet forming nozzles spaced about said wall.

6. Apparatus according to claim 5, wherein a plurality of support means are provided for said jet forming nozzles, each said support means comprising a generally radially disposed support arm which is pivotally mounted near its outboard end for vertical swinging movement, with at least one of said jet forming nozzles being supported on said arm means near its inboard end, and a control float on said arm secured to its inboard end relatively adjacent said wall.

7. Apparatus according to claim 6, further including attitude control means for each said arm means, said control means being responsive to wave action on said control float, for changing the attitude of said jet forming nozzle as necessary to maintain the outlets of said jet forming nozzles positioned to discharge generally upwardly and over said receiving chamber wall during wave action movement of such apparatus.

8. Apparatus according to claim 6, further comprising a ring of low density floatation material encircling said cylindrical wall.

9. Apparatus according to claim 8, wherein said floatation material includes radial recesses for receiving the floats at the inboard ends of the radial support arms.

10. Apparatus according to claim 9, wherein each recess includes a lower surface within the swing path of its support arm, serving as a lower stop for such arm.

11. A floating vessel including first vertical wall means forming an inner compartment, said first vertical wall means projecting upwardly from the surface of the water in which the vessel floats and including openings in the lower portion thereof spaced below such surface;

second vertical wall means spaced laterally outwardly from said first vertical wall means and with the first vertical wall means forming an outer compartment having an upwardly opening inlet, said second vertical wall means extending upwardly to provide a freeboard above the surface of the water in which the vessel floats;

means for collecting floating oil from the water outwardly of the second vertical wall means and delivering it into said outer compartment, to form a column of such oil in said outer compartment, which oil eventually flows through said openings into the inner compartment, said means comprising a plurality of jet forming nozzles, each having at least one outlet, means supporting said jet nozzles during use with their outlets positioned to discharge generally upwardly through the floating oil, over said second vertical wall means and through said inlet, into said outer compartment, and means for delivering water to and through said jet forming nozzles at sufficient discharge velocity so that such water entrains some of the oil and carries it over said second vertical wall means and through said inlet into said outer compartment; and a suction tube extending from the upper portion of the oil in said inner compartment to a collection receptacle for the oil.

12. Apparatus according to claim 11, further comprising a separated oil pickup tube having an inlet supported in an upper region of the inner compartment, said inlet being provided with a float controlled valve means adapted to be closed when water alone and when water and less than a predetermined amount of separated oil are within the inner compartment, and to open when at least said predetermined amount of separated oil is within the inner compartment.

13. Apparatus according to claim 11, wherein said vertical wall means are cylindrical, and wherein said jet forming nozzles are spaced about said second vertical wall means.

14. Apparatus according to claim 13, wherein a plurality of support means are provided for said jet forming nozzles, each said support means comprising a generally radially disposed support arm which is pivotally mounted near its outboard end for vertical swinging movement, with at least one of said jet forming nozzles being supported on said arm means near its inboard end, and a control float on said arm secured to its inboard end relatively adjacent said second vertical wall means.

15. Apparatus according to claim 14, further comprising attitude control means for each said arm means, said control means being responsive to wave action on said control float, for maintaining the outlets of said jet forming nozzles positioned to discharge generally upwardly and over said second vertical wall means during wave action movement of such apparatus.

16. Apparatus according to claim 15, further comprising a ring of low density floatation material encircling said cylindrical second vertical wall means.

17. Apparatus according to claim 16, wherein said floatation material includes radial recesses for receiving the floats at the inboard ends of the radial support arms.

18. Apparatus according to claim 17, wherein each recess includes a lower surface within the swing path of its support arm, serving as a lower stop for such arm.

* * * * *